Figure 1:
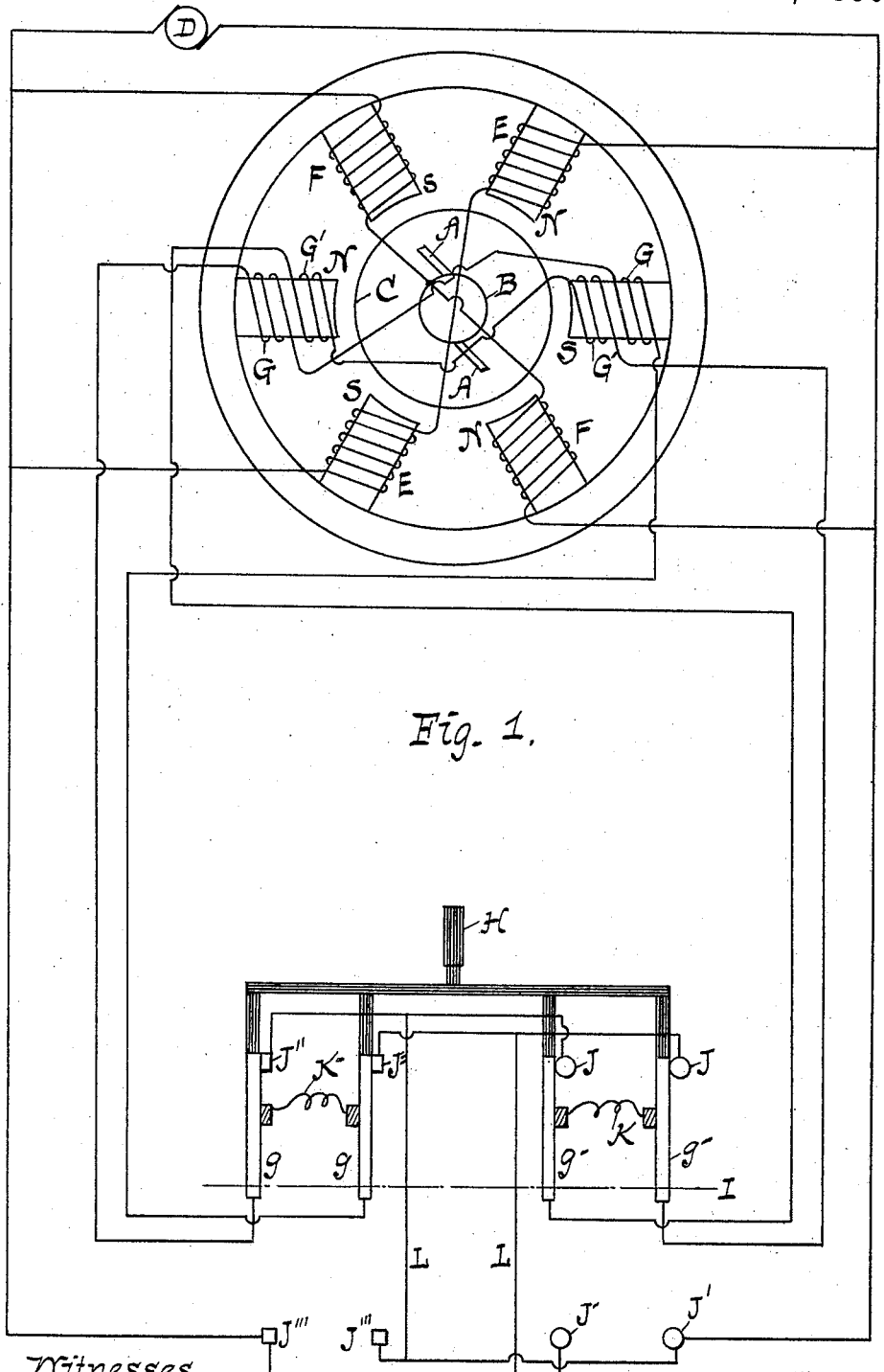

(No Model.) 2 Sheets—Sheet 1.
W. A. ANTHONY.
ELECTRIC MOTOR REGULATOR.

No. 569,989. Patented Oct. 27, 1896.

Witnesses
J. Lansing.
K. W. Edwards.

Inventor
William A. Anthony.
By Edward P. Thompson, Attorney (No Model.) 2 Sheets—Sheet 2.
W. A. ANTHONY.
ELECTRIC MOTOR REGULATOR.
No. 569,989. Patented Oct. 27, 1896.
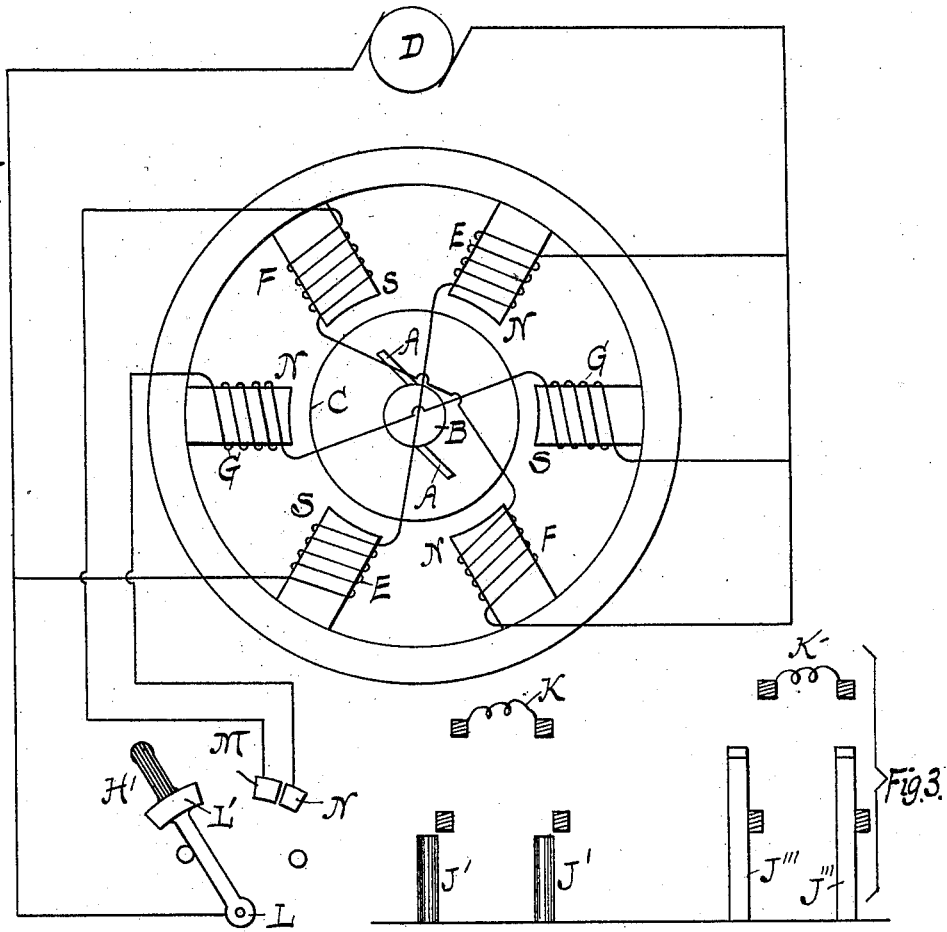
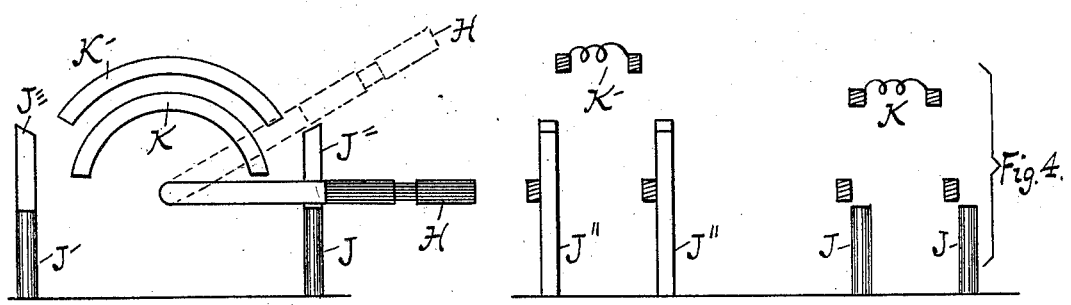
Witnesses
J. Lansing.
K. W. Edwards.
Inventor
William A. Anthony.
By Edward P. Thompson
Attorney.

UNITED STATES PATENT OFFICE.

WILLIAM A. ANTHONY, OF NEWARK, NEW JERSEY.

ELECTRIC-MOTOR REGULATOR.

SPECIFICATION forming part of Letters Patent No. 569,989, dated October 27, 1896.

Application filed July 29, 1896. Serial No. 600,999. (No model.)

*To all whom it may concern:*

Be it known that I, WILLIAM A. ANTHONY, a citizen of the United States, and a resident of Newark, county of Essex, and State of New Jersey, have invented a new and useful Improvement in Electric-Motor Regulators, of which the following is a specification.

My present invention relates generally to means for regulating electric motors, and particularly to a regulator for multipolar direct-current electric motors. The use of the motor is not limited to any particular purpose, but belongs especially to that class conveniently employed in running elevators, or for hoisting-machines, street-cars, or machinery whose speed frequently varies from zero to maximum.

By a multipolar motor I mean one having four or more field-magnet poles which are alternately north and south and whose commutator has as many neutral points as there are poles of the field-magnet. The system gives the best results in practice when applied to such multipolar machines as have an odd number of pairs of poles, as six, ten, fourteen, &c., since in such machines poles diametrically opposite to each other have opposite polarities, and two such may be taken as a pair whose magnetic strength is to be varied. By so doing, the magnetic attraction on opposite sides of the axis may be maintained in perfect balance at all times whatever variation may be made in the field-magnet strength for the purpose of varying the speed.

In applying the invention one or more pairs of magnet-coils may be cut out in succession, or a pair of coils may be cut out and then cut in again with the connections reversed, thereby reversing the current through the coils. The coils may be cut out as a whole at one operation, or they may be divided into sections, the separate sections being cut out in succession, as occasion may require.

The details of construction in so far as my invention is at all involved are represented in the accompanying drawings.

Figure 1 shows principally in diagram and partly in plan the system of regulation. The dynamo is typically shown at the top, the multipolar motor near the top, and the circuit-controller at the bottom of the drawings. Fig. 2 is an end elevation of the circuit-controller, the dotted lines indicating a different phase of the movable part of the controller. Figs. 3 and 4 are neither cross-sections nor elevations, but they represent in a diagrammatical manner the opposite end of that which is shown in side elevation in Fig. 2 and in plan in the lower part of Fig. 1. The cylindrical and square contact-posts, as well as the letters of reference, will assist in distinguishing the several electric terminals. Fig. 5 is a view similar to that shown in Fig. 1 of a modification of the circuit-controller which is shown in Figs. 1, 2, 3, and 4.

The brushes of the multipolar motor are represented by A, shown resting, as usual, upon a commutator B. In a motor having an odd number of pairs of poles the best results are obtained by using merely two brushes and placing them at one hundred and eighty degrees apart.

The armature is represented by the circle C. It is unnecessary to make a diagram of the intricate windings of such an armature, as the same are well known to those versed in this department of art. It has a two-path winding adapted for a multipolar motor.

D is a generator of electricity represented by an outline of its commutator and brushes and adapted for generating currents of one direction. The poles of the motor are in this particular construction represented six in number, and are of such polarity that any two opposite poles have opposite signs. Any two opposite coils, like E or F or G, may be connected in series with each other, forming pairs which are connected in parallel circuit with one another. The coils G' form a pair corresponding to those lettered G and constituting in conjunction therewith divided coils, so that a greater flexibility of regulation may be obtained. The division may be, if desired, further multiplied.

The essential purpose of the switch in Fig. 1 is to disconnect from the circuit in succession the several sections into which a pair of magnet-coils is divided, then to connect them into the circuit in succession, but in such a way as to reverse the current. When the field-magnets are large, a destructive spark might be produced on breaking the circuit. This may be greatly reduced by connecting the terminals of a coil together, either directly or through a suitable resistance, at the instant of disconnecting from the circuit. This switch, as shown in Fig. 1, is so constructed as to serve this last purpose as well as the essential purpose described above. Its operation will then be, assuming all the sections to be in circuit, to disconnect a section from the circuit and immediately connect together the terminals of that section, and then disconnect from the circuit another section and connect its terminals, and so on until all the sections are cut out of circuit, and then to disconnect the terminals of and cut into the circuit each of the sections in order with polarity reversed.

The detail operation of the circuit-controller shown in Figs. 1, 2, 3, and 4 may be explained in brief by stating merely that it serves to perform the following steps in the order named: First assuming that the coils G and G' are in circuit, the controller cuts out the coils G' and then short-circuits them. A further movement of the handle cuts out the coils G and immediately short-circuits them or closes them upon themselves, and then maintains them thus closed for an indefinite time. A further object of the controller is to reverse the current in one pair of coils and subsequently the current in the other pair. After this the reverse operation may be carried out, whereby the normal condition will be again reached. This preliminary description is given in order that the nature of the details may be more easily grasped.

H is an insulated handle connecting the rotary terminal $g'$ of the pair of coils G' and also the terminals $g$ of the coils G, all the terminals being rotary about an axis represented by the dotted line I, the handle serving to rotate all the terminals simultaneously about this axis. In the path of these rotary terminals are located stationary terminals for the purpose of cutting out, short-circuiting, and reversing the currents in the coils G and G'.

The contact-posts by which the coils G' are cut out by the terminals $g'$ are J when the current is passing in a given direction and J' when the current is reversed. The posts are in the path of the rotary terminal $g'$. The short-circuiting resistance adapted to operate after the cutting out of the coil G' is lettered K.

L represents the cross connection for purposes of reversal.

Similar letters with indices indicate corresponding parts to those just explained. Thus J'' are the posts which cut in and out the current from the coils G when in the normal direction and J''' the same when in the reverse direction.

K' is the short-circuiting resistance for the coil G after having been cut off from the normal current, and it is for the same coil when cut out from the current of the opposite direction.

The construction so far described serves as a basis for a statement of operation.

The operation of the system for regulating the speed of motors applies to multipolar motors having armature-windings connected for "two paths" in any of the well-known ways, so that the electromotive forces generated under the several pairs of poles are added together, giving as the total electromotive force of the armature the sum of the electromotive forces developed under the several pairs of poles. The method consists in weakening, destroying entirely, or even reversing the magnetic polarity of one or more pairs of poles, thereby varying in like manner the electromotive force developed by these armature-coils that are affected by the changed poles and so varying the total electromotive force of the armature. In Fig. 1 the system is represented in that condition in which all the coils of the field-magnets of the multipolar motor are in the normal condition, that is, the same as if there were no circuit-controller other than an ordinary switch for cutting in the machine as a whole. The motor is supposed to be running at any given speed with any given amount of work. It now becomes desirable to increase the speed of the motor. Therefore the operator raises the insulating-handle H, by which operation the pair of coils G' is disconnected from the circuit, but at the same time the coils G remain in circuit, because the posts J'' are much taller than those lettered J. It is unnecessary to set forth the mathematical relation between the resistance of the coils G G' E F, &c., it being requisite merely to state that the motor will run at a somewhat greater speed. If it is desired to decrease the speed again, the handle H is thrown back to its original position; but if it is still intended to increase the speed the handle is, instead of being thrown back, pushed over, for example, on the position shown dotted in Fig. 2, where the coils G have also been cut out. Then handle H may be turned back through the different phases named, obtaining the corresponding regulation of speed; but in order to explain the operation completely let it be assumed that the handle H is moved past the short-circuiting resistances K and K' until the posts J''' are reached by the terminals $g$. Then will the current in the coils G be reversed in view of the cross connections L. Further movement will throw the coils G', with the current, in the reverse direction. It is unnecessary to trace the operation by the movement of the handle back again to its original position.

It is evident that whereas the speed of the motor has been increased by cutting out of circuit first one pair of coils and then another, the speed is still further increased by reversing the current first in one pair and then in both pair of coils G and G'. This operation may be carried on much faster than it takes to explain it, so that in cases of elevators, for example, variations of speed from zero to maximum may be obtained in the course of a few seconds.

Instead of cutting out and then reversing one pair of coils, the regulation may be effected by cutting out two or more pairs of coils in succession, constituting a modification of the invention shown in Fig. 5, which represents a still further modification, namely, the cutting out not only of one pair of opposite coils on given poles of the field-magnet, but a second and third pair, &c., of coils on other poles of the magnet. The coils are lettered as before. The circuit-closer is shown lettered H'. The coils are all adapted to be included in parallel circuit in pairs. One terminal, L, of the circuit-closer H' is connected to one pole of the electric generator D. The other terminal, L', is adapted to come in contact with one or both of the terminals of one pair of coils F and the terminal N of the coil G. With the coils all included the speed is at a minimum. The speed may be increased by cutting out the pair of coils G and still further increased by moving the circuit-closer H' so as to cut out the pair of coils F, whereby the pair of coils E is the only pair, and consequently the motor will run at the maximum speed.

It is evident that instead of cutting out the coils belonging to a given pair of poles as a whole they may be divided into sections the same as coils G and G', to be cut out and in in succession, thereby effecting a more gradual change of speed.

I claim as my invention—

1. In combination, a multipolar motor, and means for varying the strength of any pair or pairs of field-magnet poles.

2. In combination, a multipolar motor, having an odd number of pairs of poles, and means for varying the action of the coils which belong to diametrically opposite field-magnet poles.

3. In combination, an electric motor, whose number of field-magnet poles is that of any term of an arithmetical progression, whose common difference is "4," and whose first term is "6," the field-magnet poles in their order being north, south, north, south, &c., and the polarity of every two diametrically opposite or pair of field-magnet poles being of opposite sign, and means for cutting out the current of the coils which belong to diametrically opposite field-magnet poles.

4. In combination, an electric motor whose number of field-magnet poles is that of any term of an arithmetical progression, whose common difference is "4," and whose first term is "6," the field-magnet poles in their order being north, south, north, south, &c., the polarity of every two diametrically opposite or pair of field-magnet poles being of opposite sign relatively to each other, and a circuit-controller adapted to cut out any or every two coils of said pair of coils except one pair.

5. In combination, an electric motor whose number of field-magnet poles is that of any term of an arithmetical progression, whose common difference is "4," and whose first term is "6," the field-magnet poles in their order being north, south, north, south, &c., the polarity of every two diametrically opposite or pair of field-magnet poles being of opposite sign relatively to each other, and means for reversing the direction of the current in one or more said pairs of field-magnet coils.

6. In combination, an electric motor, whose number of field-magnet poles is that of any term of an arithmetical progression, whose common difference is "4," and whose first term is "6," the poles in their order being north, south, north, south, &c., the polarity of every two diametrically opposite or pair of field-magnet poles being of opposite sign relatively to each other, and a circuit-controller, both for cutting out and reversing the currents of those coils which belong to diametrically opposite field-magnet poles.

7. In combination, an electric motor, whose number of field-magnet poles is that of any term of an arithmetical progression, whose common difference is "4," and whose first term is "6," the field-magnet poles in their order being north, south, north, south, &c., the polarity of every two diametrically opposite or pair of field-magnet poles being of opposite sign relatively to each other, and one or more pairs of field-magnet poles having each a divided coil, and a circuit-controller adapted to cut out one pair of divided coils, then to short-circuit it, then to cut out another pair, and then to short-circuit it, then to reverse the direction of the current in one pair, and then in another pair, and then to repeat the above steps in the order opposite to that named.

8. The method of operating a multipolar motor, consisting in varying the total electromotive force of the armature by varying the strength of one or more pairs of field-magnet poles.

9. The method of operating a multipolar electric motor, having an odd number of pairs of poles, consisting in varying the total electromotive force of the armature by varying the magnetic strength of one or more of the pairs of the field-magnet poles.

In testimony that I claim the foregoing as my invention I have signed my name, in presence of two witnesses, this 25th day of July, 1896.

WILLIAM A. ANTHONY. [L. S.]

Witnesses:
M. H. DUMONT,
R. W. EDWARDS.